United States Patent [19]

Rudell et al.

[11] Patent Number: 4,850,496

[45] Date of Patent: Jul. 25, 1989

[54] INFANT AND CHILD'S DRINKING SYSTEM

[76] Inventors: Elliott Rudell, 2215 W. 237th St., Torrance, Calif. 90501; Joe Cernansky, 2369 W. 246th St., Lomita, Calif. 90717; Ian Ayton, 4061 Via Pavion, Palos Verdes Estates, Calif. 90274; Rick Kamrath, 26229 Regent St., Lomita, Calif. 90717; George Foster, 2817 E. Second St., Long Beach, Calif. 90803

[21] Appl. No.: 9,461

[22] Filed: Feb. 2, 1987

[51] Int. Cl.$^4$ ........................ A47G 19/22; A47J 41/00; A61J 9/00; A61J 11/04

[52] U.S. Cl. .................................. 215/12.1; 215/11.1; 215/11.6; 220/90.2; 220/425; 229/906.1

[58] Field of Search ................ 215/12 R, 13 R, 13 A, 215/11 C, 11 R, 11 E, 10, 12.1, 13.1, 11.1, 11.6, 11.3; 220/90.4, 90.2, 420, 421, 425; 446/76, 77, 81, 408; D7/5, 9; D24/47; 206/457; 229/906.1

[56] References Cited

U.S. PATENT DOCUMENTS

| | | | |
|---|---|---|---|
| 1,637,719 | 8/1927 | Whitlock | 215/11 C |
| 1,706,034 | 3/1929 | Moore | 215/11 C |
| 2,096,961 | 10/1937 | Condon | 215/13 R X |
| 2,107,981 | 2/1938 | Ford | 446/81 |
| 2,113,848 | 4/1938 | Lui | 215/12 R |
| 2,294,539 | 9/1942 | Chaffin | 446/76 |
| 2,461,588 | 2/1949 | Cooper | 446/81 X |
| 2,489,773 | 11/1949 | Hall | 215/11 C |
| 2,792,696 | 5/1957 | Stayart | 215/11 R X |
| 2,837,232 | 6/1958 | Rossi | 215/13 R |
| 2,994,448 | 8/1961 | Sepe et al. | 215/11 C |
| 3,049,258 | 8/1962 | Fullum | 215/11 R |
| 3,258,873 | 7/1966 | Franco | 215/11 R X |
| 3,512,301 | 5/1970 | Kramer | 215/11 C |
| 4,600,111 | 7/1986 | Brown | 215/13 R X |

FOREIGN PATENT DOCUMENTS

| | | | |
|---|---|---|---|
| 967458 | 11/1950 | France | 215/11 C |
| 778912 | 7/1957 | United Kingdom | 215/11 C |

*Primary Examiner*—Sue A. Weaver
*Attorney, Agent, or Firm*—Plante, Strauss, Vanderburgh

[57] ABSTRACT

There is disclosed a container for liquids that includes interchangeable dispensing tops such as: a nipple top, a multiple hole protrusion top, a drinking straw top, and a drinking cup top. The bottle is a combination of an outer shell which has windows along its length, a rigid, cylindrical, inner container having a closed bottom, an open top and a removable cap. The cap supports one of the aforementioned dispensing means on its upper surface and is removably secured to both the inner container and outer shell.

23 Claims, 4 Drawing Sheets

INFANT AND CHILD'S DRINKING SYSTEM

BACKGROUND OF THE INVENTION

1. Field of the Invention

This invention relates to a drinking container system for infants and young children and, in particular, to a single system which accommodates infants and young children.

2. Brief Statement of the Prior Art

Many variations of the nursing baby bottle have been introduced in recent years. Most of these have included changes to the external shape of the liquid holder itself, or to the shape of the nipple. A company called Ansa has introduced a bottle with an integral hole through its middle that allows the baby a comfortable grip on the liquid holding container by virtually shaping that container into liquid holding handles.

Nipple design has seen modification from a symmetrically round bulbous form to a flattened shape, commonly marketed under the trade name NUK.

A successful improvement to the nursing bottle market has been the employment of flexible liners to hold the liquid nursing formula. The liners are retained inside a rigid outer form and attached to the bottle top. These liners collapse as the baby drinks the liquid. A typical example of this system is marketed by Playtex.

BRIEF DESCRIPTION OF THE INVENTION

The invention is a container for liquids that includes interchangeable dispensing tops which include: a nipple dispensing top, a multiple hole protrusion top, a drinking straw top, and a drinking cup top. The bottle is a combination of an outer shell which has windows along its length, a rigid, cylindrical, inner container having a closed bottom, an open top and a removable cap. The cap supports one of the aforementioned dispensing means on its upper surface. On its undersurface, the cap has an outer wall with attachment means for securing the outer shell and an inner wall with attachment means for securing the inner container. The inner and outer walls are dependent from the under surface of the cap.

DESCRIPTION OF THE PREFERRED EMBODIMENT

Figure 1:
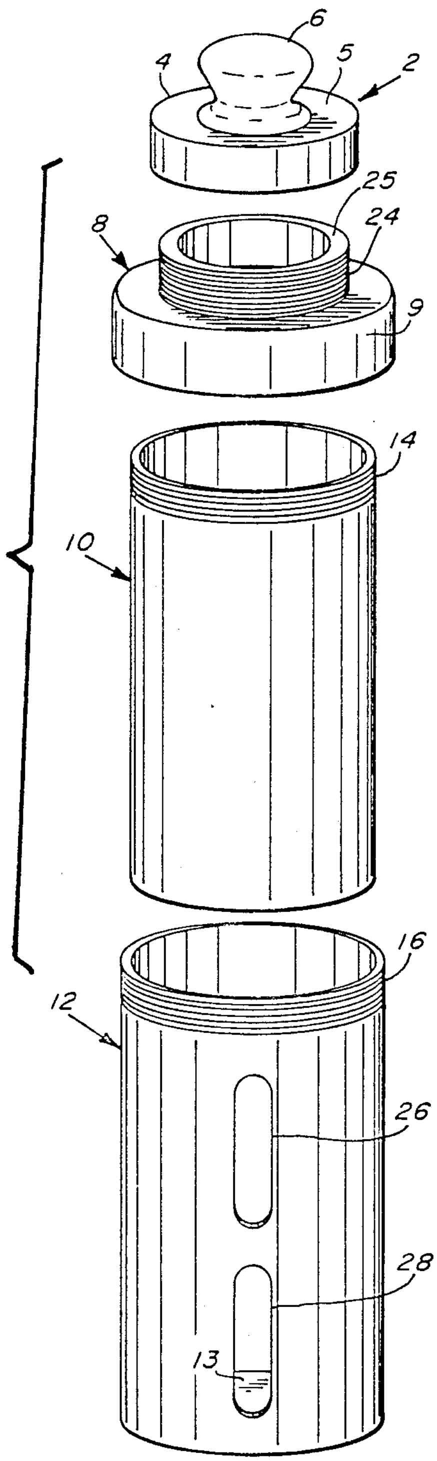
FIG. 1 is an exploded perspective view of one embodiment of the invention.

Referring now to FIG. 1, the invention is illustrated as a multiple walled container which includes a cap 2 that is formed with a generally flat disc top 5 with a central aperture that receives a latex nipple 6. The disc top 5 has an integrally molded annular skirt 4. The cap 2 fits onto adapter cap 8 which has a centrally positioned cylindrical neck 25 which has external threads 24 that mate with internal threads (not shown) on the inside wall of the skirt 4 of cap 2. The adapter cap 8 also has an annular skirt 9 and has a plurality of attachment means on its undersurface for the removable attachment of the inner cylindrical container 10 and the outer shell 12. The inner container 10 has a closed bottom and an open upper end, and has threads 14 about its open, upper end. The outer shell is generally cylindrical and has a closed bottom 13 and an open upper end. External threads 16 are provided about the upper end of the outer shell 12. Preferably, windows 26 and 28 are disposed in the wall of the outer shell 12, and most preferably, these windows are in an axial array (as shown), thereby permitting visual observation of the contents of the inner container 10.

Figure 2:
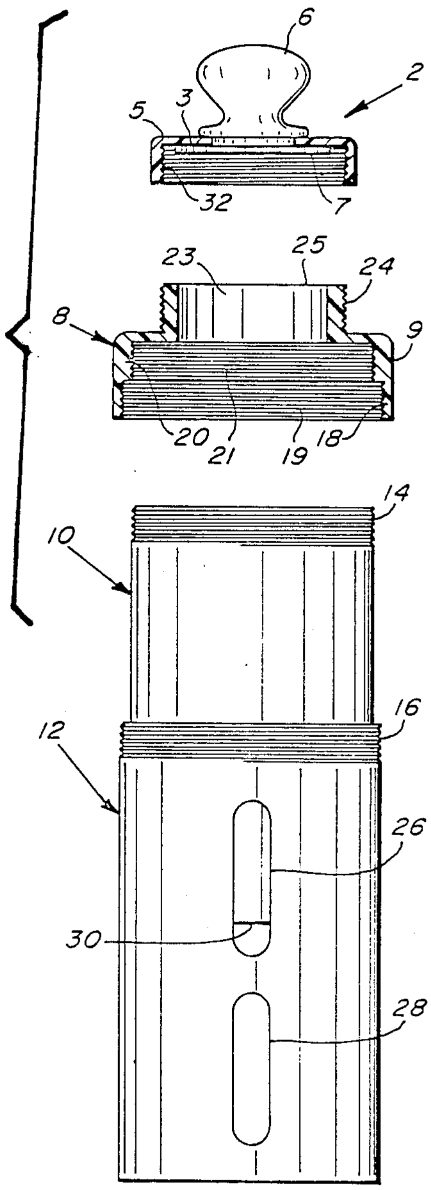
FIG. 2 is an elevational view, partially in cross section of the embodiment shown in FIG. 1.

Referring now to FIG. 2 on exploded view is shown of the assembly of the various components illustrated in FIG. 1. As there illustrated, the inner container 10, is concentrically received within the outer shell 12 with its bottom end 30 shown in window 26. The adapter cap 8 has a large diameter through aperture 23 which is surrounded by neck 25. On its undersurface, cap 8 has an inner wall 20 which is provided with internal threads 21 and an outer wall 18 which is provided with internal threads 19. The inner wall 20 has a diameter conforming to the outside diameter of inner container 10 and internal threads 21 which coact with threads 14 to receive the upper threaded neck of inner container 10. Similarly, the internal threads 19 on outer wall 18 coact with and receive the threads 16 of the outer shell 12. The inner and outer walls thus provide the attachment means permitting the removable attachment of the inner container and outer shell, respectively.

The cap 2, as previously mentioned, has a flat disc 5 with an annular skirt 4 which has internal threads 32 that coact with the external threads 24 on neck 25. Disc 5 has a central, through aperture 3 which receives the neck of nipple 6. Nipple 6 is fitted into the aperture 3, as a grommet, typical of the latex nipples of baby bottles, and has a large diameter flange 7 which is sealed by the upper edge of the neck 25 of the adapter cap 8.

Figure 3A:
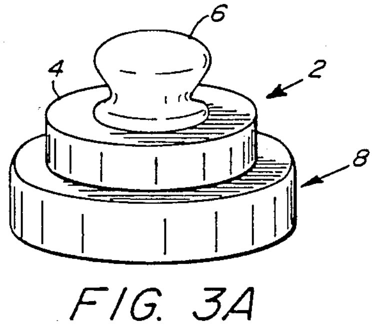
FIGS. 3A–3D illustrate interchangeable caps for the bottle.
Figure 3B:
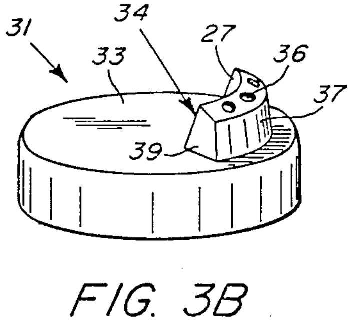

As previously mentioned, this invention comprises a drinking system which accommodates infants as well as young children. For this purpose, the adapter cap 8 and cap 2 of the invention can be interchanged with other embodiments. FIG. 3A illustrates the baby or infant version in which the nipple 6, cap 2 and adapter cap 8 are used. FIG. 3B illustrates an alternative replaceable cap 31. Cap 31 is intended for use with babies to wean them from the nipple cap shown in FIG. 3A. For this purpose, the cap 31 is provided with a single protrusion 34 which, preferably, is located adjacent to the periphery of the top disc 33 of this cap 31. This protrusion 34 can be of varied shape; it can be cylindrical, ovaloid, etc. Preferably, it has the illustrated shape with sector sidewalls 27 and 37 and radial endwalls such as 39. The protrusion 34 is provided with a plurality of through apertures 36. The balance of the cap 31 is the same as that described for adapter cap 8, including the inner and outer internally threaded walls 20 and 18, illustrated on cap 8 in FIG. 2.

Figure 3C:
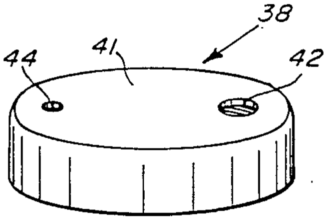

FIG. 3C illustrates another interchangeable cap 38. This cap 38 has a flat disc top 41 which is provided with at least one, small diameter aperture 42 which is of sufficient diameter to receive a conventional drinking straw. Additionally, a second aperture 44 can be provided to vent the contents of the inner container. Cap 31 also includes the inner and outer internally threaded walls which are dependent from its undersurface in the same manner as illustrated for inner wall 20 and outer wall 18 of adpater cap 8 in FIG. 2.

Figure 3D:
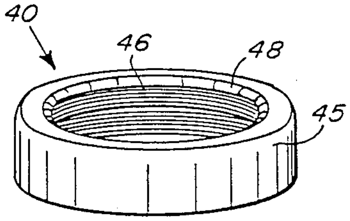

FIG. 3D illustrates the interchangeable cap 40 which can be used to convert the drinking assembly into a drinking cup. For this purpose, cap 40 is a ring, with an annular skirt 45 that is similar to the annular skirt 9 of adapter cap 8 shown in FIGS. 1 and 2 with the inner and outer, internally threaded walls 20 and 18, all shown in FIG. 2. The cap 40 has a single, large diameter aperture 48 which is of substantially the same diameter as the internal diameter of the inner container 10 (see FIGS. 1 and 2). When the inner container 10 is threaded into the internally threaded inner wall 46 of this cap, its inside wall seats flush with the wall of aperture 48, thus forming a cup with a smooth discharge aperture and internal side wall.

Figure 4:
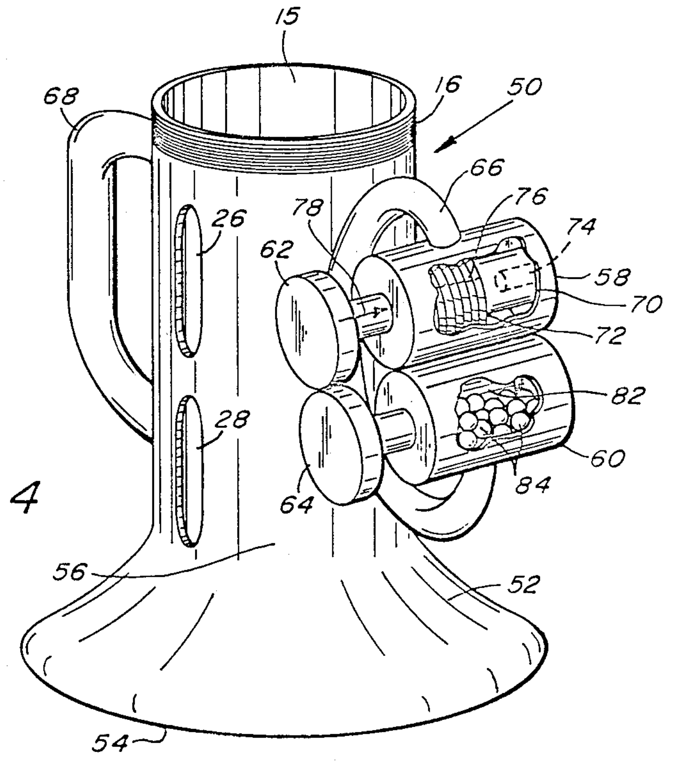
FIG. 4 is a perspective view of an alternative outer shell for use in the invention.

Referring now to FIG. 4, the invention lends itself to various modifications of shapes and sizes for the outer shell. A suitable outer shell 50 with an open upper end 15 is illustrated in FIG. 4 as a generally trumpet shape, having a bell bottom 54 with outwardly flaring sidewall 52. The outer shell 50 has a central cylindrical portion 56 which concentrically receives an inner container such as 10, illustrated in FIGS. 1 and 2. A handle 68 can be provided, dependent from one side of the cylindrical portion 56. Windows 26 and 28 can be provided in the side wall of the outer shell 50. The upper edge of outer shell 50 is provided with external threads 16, as described with reference to FIGS. 1 and 2.

To simulate a trumpet or horn, the outer shell 50 preferably supports a plurality of horn valves. For this purpose, an arm 66 is molded to the outer shell 50 and this arm 66 supports a plurality of small diameter hollow cylinders such as 58 and 60. The cylinders 58 and 60 distally carry simulated horn buttons 62 and 64. Preferably button 62 is on a rod 78 that is slidably received in an aperture in one end of the cylinder 58. Internally contained within chamber 70 within cylinder 58 is a squeaker mechanism. This mechanism includes an air bellows 76 that is attached to the end of the rod 78. Bellows 76 discharges into a cylinder 72 which contains a vibrating reed 74 that is mounted in a discharge air passageway. In this manner, depressing button 62 compresses bellows 76, forcing air through the discharge orifice, past the reed 74 whereby the assembly functions as a noise maker or whistle.

The outer shell 50 could be similarly provided with a second noise maker and the orifice diameters and/or reeds employed could be of varied size to provide varied tones from the noise maker. More preferably, however, the second small diameter hollow cylinder 60 is provided with a plurality of beads 84 which are hard-surfaced, and are loosely contained in chamber 82 within the hollow cylinder 60. In this manner, the cylinder 60 will function as a rattle.

Figure 5:
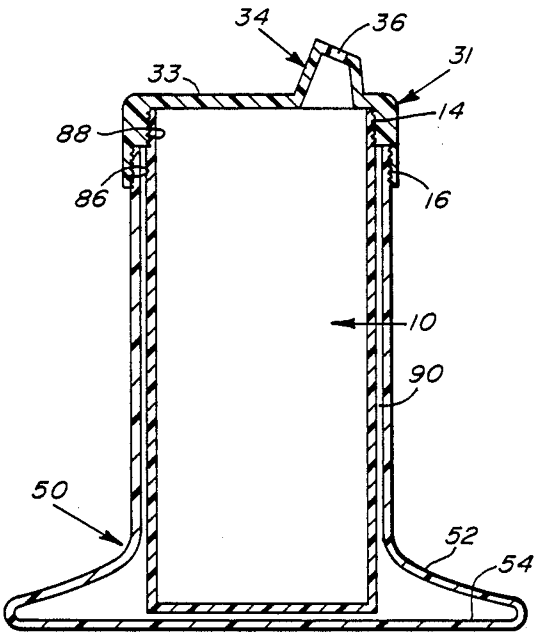
FIG. 5 is an elevational sectional view of the bottle system used with a protrusion dispensing means and the outer shell of FIG. 4.

Referring now to FIG. 5, there is illustrated a sectional view of the outer shell 50 shown in FIG. 4, with an inner container 10 and dispensing cap 31. In the assembly, the dispensing cap 31 receives the open upper end of the inner container 10 with threads 14 engaged by internally threaded inner wall 88. The internally threaded outer wall 86 is received over the threads 16 of the outer shell 50. As illustrated, the assembly provides for thermal insulation of the contents of the inner container 10, as this inner container 10 is spaced apart from the side wall of the outer shell 50 by an air gap 90. The lower end of the inner container 10 is received in the outwardly flared bell-bottom (wall 52 of the outer shell) and is also separated from the bottom wall 54 by an air gap.

Figure 6:
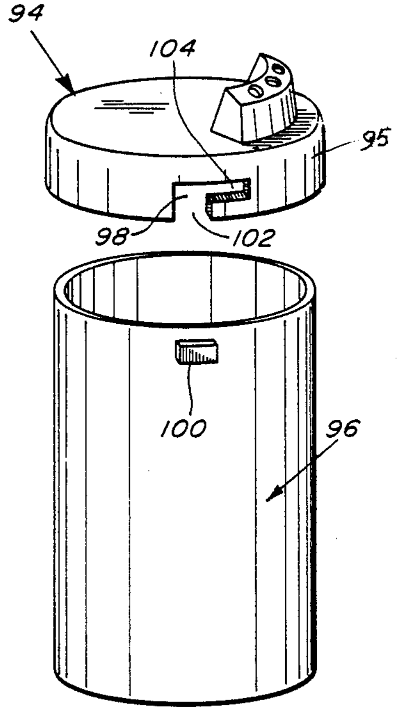
FIG. 6 illustrates an alternative attachment means for an outer shell of the bottle.

Referring now to FIG. 6, an alternative attachment for securing an outer shell 96 to the adapter cap 94 is illustrated. For this purpose, the outer shell 96 is provided with at least one, and preferably two, keys 100 near its upper edge. The cap 94 is provided with an L-shaped slot 102 in its annular skirt 95. This L-shaped slot 102 includes an axial slot 98 which extends from the lower edge of skirt 95 and intersects a sector slot 104. Slot 98 is sufficiently wide to receive key 100 and slot 104 also has sufficient width to receive the key 100 as the cap is rotated, in a clockwise direction as viewed in FIG. 6.

Figure 7:
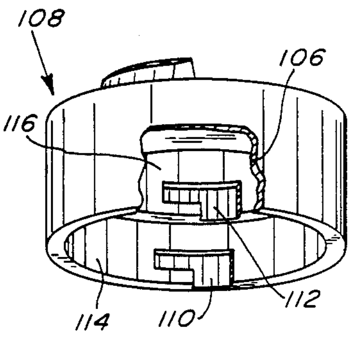
FIG. 7 illustrates the protrusion dispensing means with the alternative outer shell and inner container attachment.

The attachment means illustrated for the outer shell 96 can also be used for the inner container such as 10 previously described. As illustrated in FIG. 7, the cap 108 is provided with slots 110 and 112 which are similar to the slot 102, previously described with reference to FIG. 6. Slot 110 is on the outer wall 114 while slot 112 is on the inner wall 116, all on the inside of the annular skirt 106 of cap 108.

Figure 8:
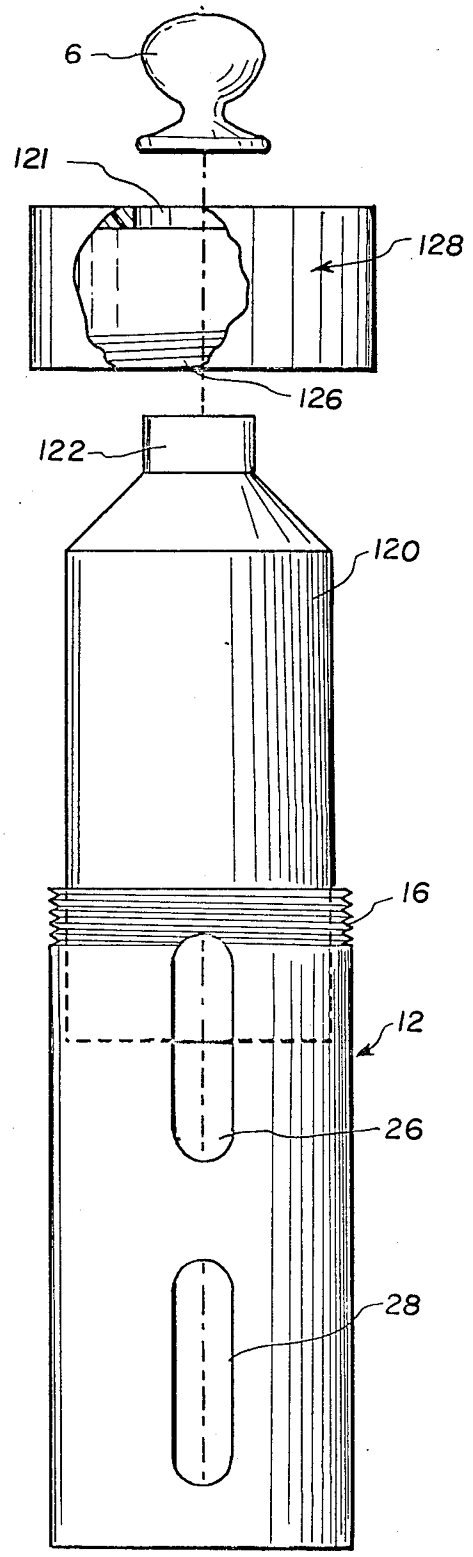
FIG. 8 illustrates use of the outer shell and cap with a conventional baby bottle.

Referring now to FIG. 8, the invention is shown as applied to a conventional baby bottle 120, which can be of glass, or plastic. The bottle 120 has a neck 122 of reduced diameter, which receives a conventional nipple 6. The bottle 120 is received within the outer shell 12, which has the aforementioned windows, or slots 26 and 28. The cap 128 for the shell has internal threads 126 for fitting securely onto the upper threaded end 16 of the shell 12, and has a central opening 121 to receive the neck 122 of the bottle 120, which extends through the cap 128.

The invention has been described with reference to the illustrated and presently preferred embodiment. It is not intended that the invention be unduly limited by this disclosure of the presently preferred embodiment. Instead, it is intended that the invention be defined by the means and their obvious equivalents set forth in the following claims.

What is claimed is:

1. A container for liquids comprising:

a. an outer shell;

b. a cylindrical inner container having an open top and closed bottom, concentrically received in said outer shell;

c. a cap having a flat top and dependent from its undersurface:

(1) a cylindrical inner wall of a diameter to receive the open end of said inner container; and (2) an outer wall of a size and shape to receive said outer shell;

d. attachment means comprising external means on the upper edges of said outer shell and said inner container for the removable attachment of each to coacting internal means on the respective inner and outer walls on the undersurface of said cap; and e. liquid dispensing means in said flat top of said cap.

2. The container of claim 1 wherein said outer shell is trumpet-shaped.

3. The container of claim 1 wherein said outer shell has at least one smaller diameter, hollow cylinder dependent on its outer wall and orthogonal thereto, simulating a trumpet valve.

4. The container of claim 3 wherein said smaller diameter, hollow cylinder houses a noise maker.

5. The container of claim 1 wherein said outer shell has a closed bottom.

6. The container of claim 1 wherein said outer shell has at least one vertically elongated window in its sidewall.

7. The container of claim 1 wherein said outer shell has a plurality of windows in a longitudinal array.

8. The container of claim 7 wherein said windows are open slots in the sidewall of said outer shell.

9. The container of claim 1 wherein said inner and outer walls are integral and formed by a stepped diameter annular skirt which is dependent from the undersurface of said cap.

10. The container of claim 1 wherein said attachment means comprise threads on the upper edges of said inner container and outer shell with coacting and mating threads on said inner and outer walls.

11. The container of claim 1 wherein said attachment means include at least one key on the upper edge of at least one of said inner container and outer shell, and a coacting keyway of the respective inner and outer walls to receive said key.

12. The container of claim 11 wherein each keyway is an L-shaped slot with an axial slot leg extending from the lower edge of its respective wall and intersecting a sector slot leg.

13. The container of claim 1 wherein said dispensing means is an aperture surrounded by an annular rim with a nipple removably mounted thereon to form a baby bottle.

14. The container of claim 1 wherein said dispensing means is a raised boss located at the periphery of said cap and having at least one thorough aperture.

15. The container of claim 1 wherein said dispensing means is a small diameter aperture in said cap to receive a drinking straw.

16. The container of claim 1 wherein said dispensing means is an aperture of a diameter substantially equal to the internal diameter of said inner container.

17. A container for liquids comprising:

a. an outer shell;

b. a cylindrical inner container having an open top and closed bottom, concentrically received in said outer shell;

c. a cap having a flat top and dependent from its undersurface:

(1) a cylindrical inner wall of a diameter to receive the open end of said inner container; and (2) an outer wall of a size and shape to receive said outer shell;

d. attachment means on the upper edges of said outer shell and said inner container for the removable attachment of each to its respective inner and outer walls on the undersurface of said cap; and e. liquid dispensing means in said flat top of said cap;

f. at least one smaller diameter, hollow cylinder dependent on the outer wall of said outer shell and orthogonal thereto, simulatiang a trumpet valve;

g. a noise maker housed within said smaller diameter hollow cylinder and including a movable button, an air bellows attached thereto and a squeaker connected to said bellows.

18. The container of claim 17 wherein said at least one smaller diameter hollow cylinder includes first and second, smaller diameter, hollow cylinders dependent on its outer wall and orthogontal thereto, simulating trumpet valves.

19. The container of claim 18 wherein one of said smaller diameter, hollow cylinders houses said noise maker and the outer houses a rattle.

20. The container of claim 19 wherein said rattle comprises a plurality of hard surfaced beads loosely contained within the other of said smaller diameter, hollow cylinders.

21. The combination of a container for liquids comprising:

a. an outer shell;

b. a cylindrical inner container having an open top and closed bottom, concentrically received in said outer shell;

c. at least two caps, each having a flat top and dependent from its undersurface:

(1) a cylindrical inner wall of a diameter to receive the open end of said inner container; and (2) an outer wall of a size and shape to receive said outer shell; and d. said two caps having dissimilar dispensing means comprising one of:

(1) a central aperture surrounded by an annular rim with a nipple removably mounted thereon to form a baby bottle;

(2) a raised boss located at the periphery of said cap and having at least one thorough aperture;

(3) a small diameter aperture in said cap to receive a drinking straw; or (4) an aperture of a diameter substantially equal to the internal diameter of said inner container.

22. The combination of claim 21 including three of said caps having dissimilar dispensing means comprising one each of the dispensing means of paragraphs (d) (1) through (d) (4).

23. The combination of claim 21 including four of said caps, each one thereof having a respective one of said dispensing means of paragraphs (d) (1) through (d) (4).

* * * * *